US007564819B2

United States Patent
Khan

(10) Patent No.: US 7,564,819 B2
(45) Date of Patent: Jul. 21, 2009

(54) METHOD OF INTERLACING FRAMES

(75) Inventor: Farooq Ullah Khan, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 936 days.

(21) Appl. No.: 10/660,970

(22) Filed: Sep. 12, 2003

(65) Prior Publication Data

US 2005/0058101 A1 Mar. 17, 2005

(51) Int. Cl.
*H04B 7/00* (2006.01)
*H04L 27/00* (2006.01)

(52) U.S. Cl. .......................... 370/335; 455/69; 375/260

(58) Field of Classification Search ....................... None
See application file for complete search history.

(56) References Cited

U.S. PATENT DOCUMENTS

| | | | | | |
|---|---|---|---|---|---|
| 4,845,704 | A | * | 7/1989 | Georgiou et al. | 370/380 |
| 5,995,496 | A | * | 11/1999 | Honkasalo et al. | 370/318 |
| 2003/0063587 | A1 | * | 4/2003 | Cho et al. | 370/335 |
| 2003/0133423 | A1 | * | 7/2003 | LaDue | 370/330 |
| 2003/0210668 | A1 | * | 11/2003 | Malladi et al. | 370/335 |
| 2004/0202147 | A1 | * | 10/2004 | Hakkinen et al. | 370/351 |
| 2005/0020295 | A1 | * | 1/2005 | Attar et al. | 455/522 |

FOREIGN PATENT DOCUMENTS

EP      1 182 797      2/2002

OTHER PUBLICATIONS

Pending, U.S. Appl. No. 10/435,966, filed May 12, 2003.
Pending, U.S. Appl. No. 10/435,978, filed May 12, 2003.
European Search Report.
U.S. Appl. No. 09/936,104, filed Feb. 28, 2000, pending.
International Search Report.

* cited by examiner

*Primary Examiner*—Nick Corsaro
*Assistant Examiner*—Joel Ajayi

(57) ABSTRACT

A method of wireless communication. The method includes the step of transmitting at least one sub-frame associated with a first frame using at least a first wireless resource, such as a channelization code, a channelization tone and/or an allocated power transmit level. The method also includes the step of transmitting at least one sub-frame associated with a second frame. The sub-frame associated with the second frame may use at least a second wireless resource if a non-acknowledgement message associated with the first frame is received. However, if an acknowledgement message associated with the first frame is received, the sub-frame associated with the second frame may use at least the first and second wireless resources. Both first and second frames, and the sub-frames associated thereto may be assigned to a single user to reduce potential delay in real-time wireless services, such as voice, video or wireless gaming, for example.

22 Claims, 2 Drawing Sheets

METHOD OF INTERLACING FRAMES

BACKGROUND OF THE INVENTION

I. Field of the Invention

The present invention relates to telecommunications, and more particularly, to wireless communications.

II. Description of the Related Art

Wireless communications systems provide wireless service to a number of wireless or mobile units situated within a geographic region. The geographic region supported by a wireless communications system is divided into spatially distinct areas commonly referred to as "cells." Each cell, ideally, may be represented by a hexagon in a honeycomb pattern. In practice, however, each cell may have an irregular shape, depending on various factors including the topography of the terrain surrounding the cell. Moreover, each cell is further broken into two or more sectors. Each cell is commonly divided into three sectors, each having a range of 120 degrees, for example.

A conventional cellular system comprises a number of cell sites or base stations geographically distributed to support the transmission and reception of communication signals to and from the wireless or mobile units. Each cell site handles voice communications within a cell. Moreover, the overall coverage area for the cellular system may be defined by the union of cells for all of the cell sites, where the coverage areas for nearby cell sites overlap to ensure, where possible, contiguous communication coverage within the outer boundaries of the system's coverage area.

Each base station comprises at least one radio and at least one antenna for communicating with the wireless units in that cell. Moreover, each base station also comprises transmission equipment for communicating with a Mobile Switching Center ("MSC"). A mobile switching center is responsible for, among other things, establishing and maintaining calls between the wireless units, between a wireless unit and a wireline unit through a public switched telephone network ("PSTN"), as well as between a wireless unit and a packet data network ("PDN"), such as the Internet. A base station controller ("BSC") administers the radio resources for one or more base stations and relays this information to the MSC.

When active, a wireless unit receives signals from at least one base station over a forward link or downlink and transmits signals to at least one base station over a reverse link or uplink. Several approaches have been developed for defining links or channels in a cellular communication system, including time-division multiple access ("TDMA"), orthogonal-frequency division multiple access ("OFDMA") and code-division multiple access ("CDMA"), for example.

In TDMA communication systems, the radio spectrum is divided into time slots. Each time slow allows only one user to transmit and/or receive. Thusly, TDMA requires precise timing between the transmitter and receiver so that each user may transmit their information during their allocated time.

In a CDMA scheme, each wireless channel is distinguished by a distinct channelization code (e.g., spreading code, spread spectrum code or Walsh code). Each distinct channelization code is used to encode different information streams. These information streams may then be modulated at one or more different carrier frequencies for simultaneous transmission. A receiver may recover a particular stream from a received signal using the appropriate channelization code to decode the received signal.

In OFDMA systems, a carrier signal may be defined by a number (e.g., 1024) of sub-carriers or tones transmitted using a set of mathematically time orthogonal continuous waveforms. Each wireless channel may be distinguished by a distinct channelization tone. By employing orthogonal continuous waveforms, the transmission and/or reception of the tones may be achieved, as their orthogonality prevents them from interfering with one another.

With respect to real-time and/or circuit switched services, such as voice, video and wireless gaming applications, for example, conventional cellular communication systems employ dedicated channels or links between a wireless unit(s) and a base station. Voice communications and other real-time and/or circuit switched services are delay-intolerant by nature. Consequently, wireless units in wireless cellular communication systems transmit and receive signals over one or more dedicated links. Here, each active wireless unit generally requires the assignment of a dedicated link on the downlink, as well as a dedicated link on the uplink.

Dedicated links supporting real-time and/or circuit switched services use outer-loop and inner-loop power control to achieve a desired frame error rate ("FER") and to reduce interference. Outer-loop power control may be employed to establish the signal-to-interference ratio ("SIR") target, while the inner-loop power control strives to realize the SIR target. For example, a base station may measure the received signal quality and, in turn, transmit a command signal (e.g., Transmit Power Control or TPC bits) conveying a "power up" and/or a "power-down" command to the wireless unit. On receiving this signal, the wireless unit may adjust its power accordingly.

Power control may, however, introduce unwanted errors into the system. These errors in power control may arise from inaccurate estimates of the channel quality due to measurement errors and command signal (e.g., TPC) transmission errors. Moreover, these unwanted errors may arise from a delay in responding to a TPC command. The received signal quality may be measured at the base station (or the wireless unit, in the alternative) and the transmit power may be updated at the wireless unit (or the base station, in the alternative) in response to a received TPC command. The TPC feedback delays may be attributed in part to the time necessary to perform measurement processing, as well as the time required to transmit the command signal. Channel quality may vary at a faster rate as the speed of the wireless unit increases. Therefore, at higher mobile speeds, the power control process may be unable to accurately track the channel quality, thereby resulting undesirable inefficient use of the radio resources.

With the explosion of wireless telephony, another growing concern for cellular service providers has been the capacity for real-time and/or circuit switched services. As the number of wireless users has continued to blossom, increasing voice capacity, for example, has caused the degradation of quality each user may experience. Moreover, as capacity is increased to support an ever-larger number of wireless users, additional issues, including, for example, uplink interference between these users in a single sector may also surface. A tradeoff exists, therefore, between quality and capacity.

Consequently, a demand exists for a method of increasing system capacity for real-time and/or circuit switched services, while reducing unwanted errors introduced by means of power control, without unduly influencing the quality each wireless user may experience.

SUMMARY OF THE INVENTION

The present invention provides a method of increasing system capacity for real-time and/or circuit switched services, while reducing the unwanted errors introduced by means of power control, without unduly influencing the quality each wireless user may experience. More particularly, the present invention provides a method of interlacing frames using a retransmission scheme, such as, for example, hybrid automatic repeat request ("HARQ"). Within the context of the present invention, each frame may comprise a plurality of sub-frames. The present invention provides a method for interlacing these frames by assigning at least a first and a second resource to a sub-frame of the second frame if an acknowledgement message associated with the first frame is received, while assigning at least the second channelization term to the sub-frame of the second frame if a non-acknowledgement message associate with the first frame is received. For the purposes of the present disclosure, the term wireless resource is intended to encompass a channelization term, such as a channelization code (e.g., CDMA technology) or a channelization tone (e.g., OFDMA technology), for example, as well as an allocated power transmit level.

In one exemplary embodiment, at least one sub-frame associated with a first frame may be first transmitted using at least a first wireless resource (e.g., channelization code, channelization tone, and/or allocated transmit power level). If an acknowledgement message corresponding with the first frame is received, at least one sub-frame associated with a second frame may use at least a first and a second wireless resource. If a non-acknowledgement message associated with the first frame is received, the sub-frame(s) associated with the second frame may use at least a second wireless resource. In response to receiving this non-acknowledgement message, at least another sub-frame from the first frame may be transmitted using at least the first wireless resource concurrently with the transmission of the at least one sub-frame from the second frame using the second wireless resource. Each of the first and second frames may comprise a plurality of incrementally redundant sub-frames interspersed with one or more do-not-transmit ("DTX") sub-frames. Both first and second frames, and the sub-frames associated thereto may be assigned to a single user to reduce potential delay in real-time wireless services, such as voice, video or wireless gaming, for example.

In another exemplary embodiment, if an acknowledgement message associated with a first frame is transmitted, at least one sub-frame associated with a second frame may be received using at least a first and a second wireless resource (e.g., channelization code, channelization tone and/or allocated transmit power level). If a non-acknowledgement message associated with the first frame is transmitted, the sub-frame(s) associated with the second frame may be received using at least the second wireless resource. The reception of a sub-frame associated with the first frame using at least the first wireless resource may be anticipated in response to transmitting the non-acknowledgement message associated with the first frame. This sub-frame associated with the first frame may be received concurrently with the one sub-frame from the second frame using the second wireless resource in response to transmitting the non-acknowledgement message associated with the first frame. Here, one of the sub-frames associated with the first frame may be received using at least the first wireless resource, or, the sub-frames associated with the first frame may fail to be received before a time out condition occurs.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides a method of increasing system capacity for real-time and/or circuit switched services, while reducing the unwanted errors introduced by means of power control, without unduly influencing the quality each wireless user may experience. More particularly, the present invention provides a method of interlacing frames using a retransmission scheme. Various retransmission methods may be employed in conjunction with the present invention, including a number of HARQ techniques, such as Chase combining protocol and incremental redundancy protocol, for example. It should be further noted that the method of the present invention might be applicable on both the uplink and the downlink.

Within the context of the present invention, each frame may comprise a plurality of sub-frames. The present invention interlaces these frames by assigning at least a first and a second wireless resource, such as a channelization code, channelization tone and/or allocated transmit power level, for example, to a sub-frame of the second frame if an acknowledgement message associated with the first frame is received. Similarly, at least the second wireless resource may be while assigned to the sub-frame of the second frame if a non-acknowledgement message associate with the first frame is received.

Figure 1:
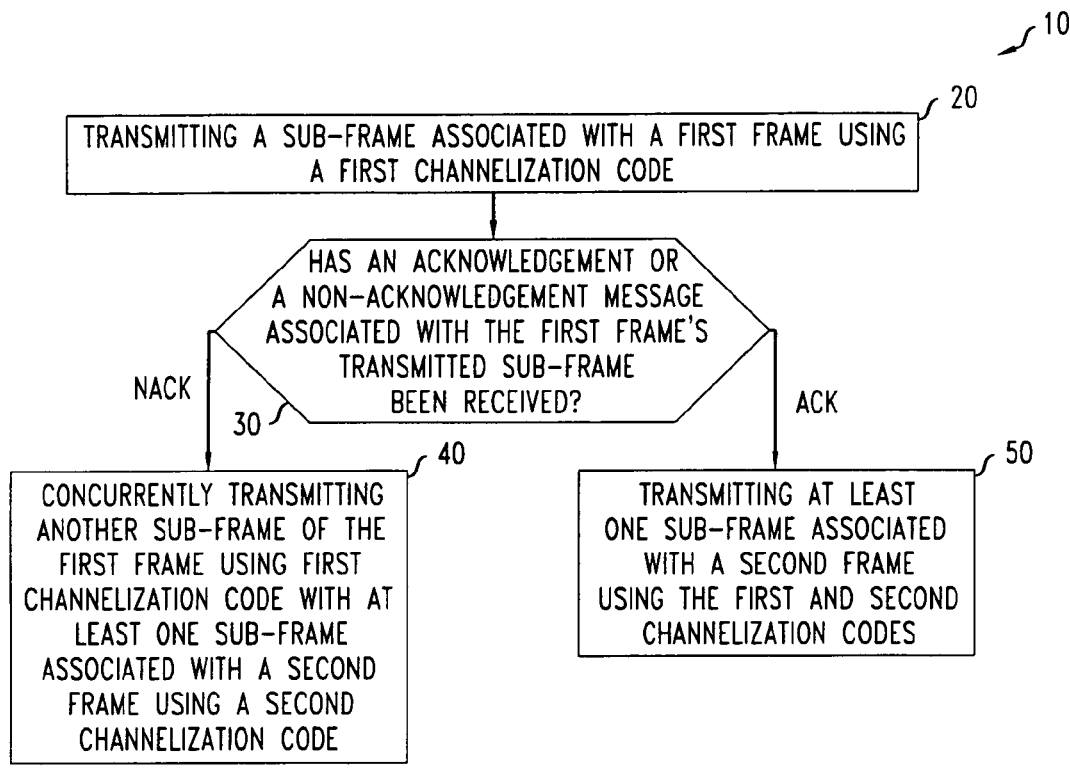
FIG. 1 depicts a flow chart according to one embodiment of the present invention.

Referring to FIG. 1, an exemplary flow chart 10 of an embodiment of the present invention is illustrated. More particularly, flow chart 10 depicts a method of interlacing at least a first and second frame. It should be noted that first and/or second frames may support real-time and/or circuit switched services, such as voice, video and wireless gaming applications, for example.

The first and/or second frame may comprise a plurality of encoded sub-frames supportive of a retransmission scheme. Consequently, each plurality may comprise a number of incrementally redundant sub-frames, for example. Moreover, each plurality may also comprise one or more do-not-transmit ("DTX") sub-frames interspersed between the incrementally redundant sub-frames. Both first and second frames, and the sub-frames associated thereto may be assigned to a single user to reduce potential delay in supporting real-time wireless services and/or circuit switched services, such as voice, video or wireless gaming, for example.

The method reflected in flow chart 10 initially involves the step of transmitting at least a first sub-frame associated with a first frame (step 20). The first sub-frame here is transmitted using a first wireless resource. For the purposes of the present disclosure, a wireless resource is intended to encompass a channelization term, such as a channelization code or a channelization tone, as well as an allocated power transmit level, for example.

Once transmitted, the retransmission scheme of the present invention necessitates the determination as to whether the first sub-frame has been received. The method, consequently, involves the step of determining whether an acknowledgement message ("ACK") has been received, corresponding with the receipt of the first sub-frame (step 30). Alternatively, this step determines whether a non-acknowledgement message ("NACK") has been received, corresponding with the non-receipt of the first frame's sub-frame.

If a NACK has been received in accordance with the retransmission scheme of the present invention, then another sub-frame associated with the first frame may be transmitted. For example, a subsequent incrementally redundant sub-frame associated with a plurality of sub-frames of the first frame may be transmitted. This next sub-frame associated with the first frame employs at least the first wireless resource, as do any remaining sub-frames associated with the first frame that may be used in conjunction with the retransmission scheme.

In so doing, at least one sub-frame associated with the second frame may also be transmitted concurrently with the transmission of the next sub-frame of the plurality associated with the first frame using the first wireless resource (step 40). Unlike the sub-frame of the first frame using the first wireless resource, however, the sub-frame associated with the second frame may use a second resource. In the event the wireless resource is a channelization term, such as a channelization code or tone, the relative orthogonality of the terms averts interference with each other. As a result, it may be said that the sub-frames associated with the first and second frames are interlaced with one another. If the wireless resource is realized by or also includes allocated transmit power level, the sub-frames associated with the first and second frames, respectively, might divide the available transmit power from the transmit power budget equally, or, in the alternative, unequally amongst each sub-frame. The later circumstance might be conditioned on various other user parameters, for example.

On the other hand, if an ACK is received in accordance with the retransmission scheme, then at least one sub-frame associated with the first frame has been received. As a result, no further sub-frames associated with the first frame may be expected and the remaining sub-frames associated with the first frame are terminated from being transmitted. It should be noted that this circumstance might alternatively arise if none of the sub-frames associated with the first frame, for example, have been received within a designated time period (e.g., a time-out condition).

In this scenario, the first wireless resource may be used in addition to the second wireless resource in transmitting at least one sub-frame of the second frame in response to an ACK (step 50). If each wireless resource is realized by a channelization term, such as a code or tone, for example, use of both terms in the transmission of the second frame's sub-frame may increase the likelihood of reception. Similarly, if the wireless resource is realized by or also includes allocated transmit power level, the second frame's sub-frame may use the transmit power formerly allocated to the first frame.

Thereafter, the method supports transmitting at least one sub-frame associated with a subsequent frame. Here, the sub-frame uses the first channelization term if a NACK associated with the second frame is received. This NACK may be generated until one of the second frame's sub-frames is received or a time-out condition arises. As noted hereinabove, each of the second frame's sub-frames may be incrementally redundant. Similarly, if an ACK associated with the second frame is received, then the sub-frame associated with the subsequent frame uses the first and second channelization terms.

It should be also noted that a sub-frame of the second frame might be transmitted before the one of the first frame's sub-frames is received. Here, an ACK may be generated for the second frame's sub-frame before an ACK is generated for any of the sub-frames associated with first frame or a time out condition occurs. This scenario might arise if the number of slots corresponding with each frame is multiple of the number of encoded sub-frames (e.g., 4 sub-frames and 16 slots for each frame). In this arrangement, the second wireless resource might be idle without reallocation. Thusly, any sub-frame of first frame that is being transmitted as part of a retransmission scheme may employ both first and second channelization terms to increase the likelihood that this sub-frame may be received.

Moreover, it will be apparent to skilled artisans from the present disclosure that the overall channelization term space—e.g., channelization code or channelization tone space—might not be affected in accordance with the present invention. Once a channelization term, such as a spreading or Walsh code is assigned to a user, derivatives may be conjured up by merely lengthening the channelization code or tone by one bit. These derivative channelization terms, however, remain orthogonal with each other.

Figure 2:
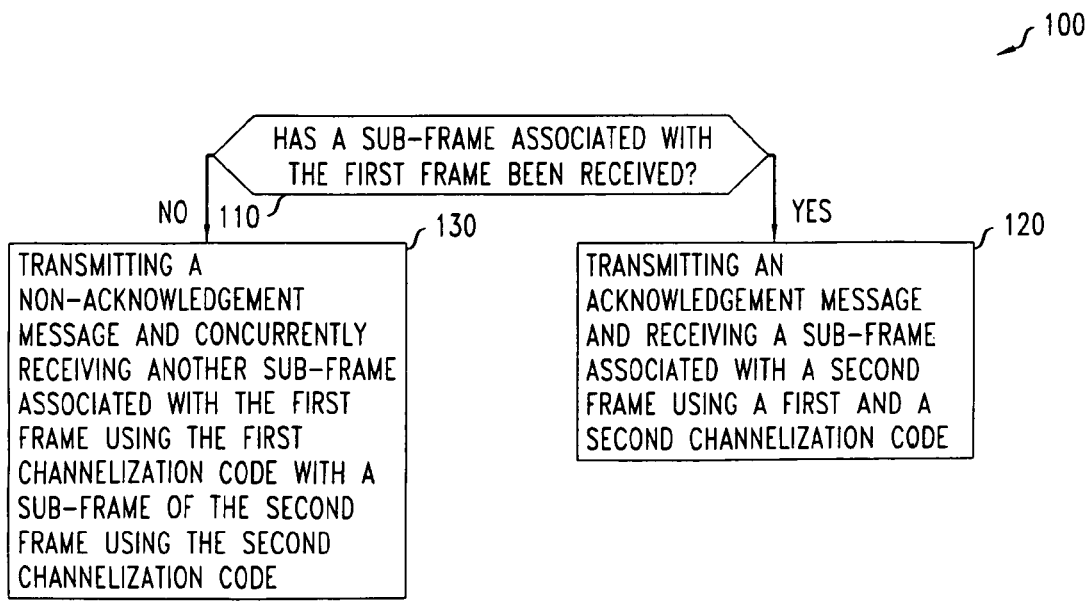
FIG. 2 depicts a flow chart according to another embodiment of the present invention.

Referring to FIG. 2, an exemplary flow chart 100 of another embodiment of the present invention is illustrated. More particularly, flow chart 100 depicts a method of receiving at least a first and a second interlaced frame. As noted hereinabove, these frames may be assigned to a single user to support real-time and/or circuit switched services, such as voice, video and wireless gaming applications, for example.

The method reflected in flow chart 100 initially involves the step of determining whether a sub-frame associated with a first frame has been received (step 110). Each of the first and second frames may comprise a plurality of encoded sub-frames supporting of a retransmission scheme, such as HARQ, for example. Consequently, the method of present invention necessitates ascertaining if one of the plurality of encoded sub-frames has been received prior to transmitting a subsequent encoded sub-frame.

As a result of determining whether a sub-frame associated with a first frame has been received, an acknowledgement ("ACK") message may be transmitted (step 120). In conjunction with transmitting the ACK, a sub-frame associated with the second frame may be transmitted by the transmitter, thereby affording the receiver the opportunity to receive the second frame's sub-frame. This sub-frame of the second frame may use at least a first and a second wireless resource, such as a second channelization term. If each wireless resource is realized by a channelization term, such as a code or tone, for example, use of both terms in the transmission of the second frame's sub-frame may increase the likelihood of its reception. The flexibility to use both first and second wireless resources is made available by the reception of the sub-frame associated with the first frame. Thusly, if the wireless resource is also realized by or includes allocated transmit power level, the second frame's sub-frame may use the transmit power formerly allocated to the first frame.

In the alternative, if is it determined that the sub-frame associated with a first frame has been not been received, a non-acknowledgement ("NACK") message may be transmitted (step 130). This NACK establishes the need for the transmitter to transmit another sub-frame within the plurality of sub-frames associated with the first frame, should any remain. It should be noted, however, that the potential exists for a time-out condition to have also transpired, wherein none of the sub-frames associated with the first frame have been received within a designated time period.

In the event one or more sub-frames associated with the first frame are available in support of a retransmission scheme and a time-out condition has not occurred, this first frame's sub-frame may be received concurrently with a sub-frame of the second frame. Here, the sub-frame of the first frame may employ at least the first wireless resource, such as a first channelization term, for example, while the second frame's sub-frame may employ at least the second wireless resource, such as a second channelization term, for example.

If the wireless resource is a channelization term, such as a channelization code or tone, the relative orthogonality of the terms averts interference with each other in their reception. As a result, it may be said that the sub-frames associated with the first and second frames are interlaced with one another. This interlacing of frames, however, may reallocate the second wireless resource if one of the first frame's sub-frames, as part of the retransmission scheme, is received—in this circumstance, an ACK should be transmitted and the both first and second wireless resources may again be used by the sub-frame of the second frame, for example. If the wireless resource is realized by or also includes allocated transmit power level, the sub-frames associated with the first and second frames, respectively, might divide the available transmit power from the transmit power budget equally, or, in the alternative, unequally amongst each sub-frame. The later circumstance might be conditioned on various other user parameters, for example.

It should be also noted that a sub-frame of the second frame might be received before the one of the first frame's sub-frames are yet received. This scenario might arise if the number of slots corresponding with each frame is multiple of the number of encoded sub-frames (e.g., 4 sub-frames and 16 slots for each frame). In this arrangement, the second channelization term might be idle without reallocation. Thusly, any sub-frame of first frame that is being transmitted as part of a retransmission scheme may employ both first and second channelization terms to increase the likelihood that this sub-frame may be received.

Figure 3:
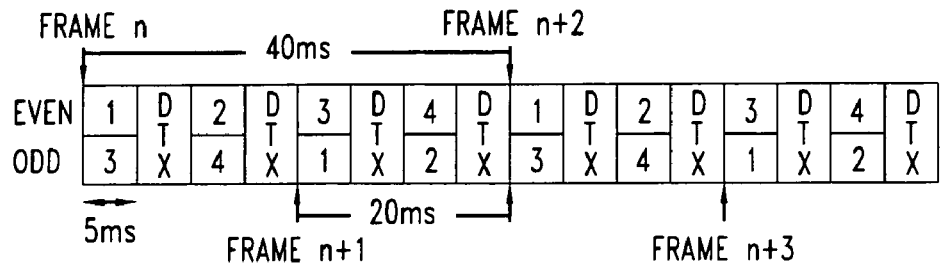
FIGS. 3-6 depict aspects of an example of the present invention.
Figure 4:
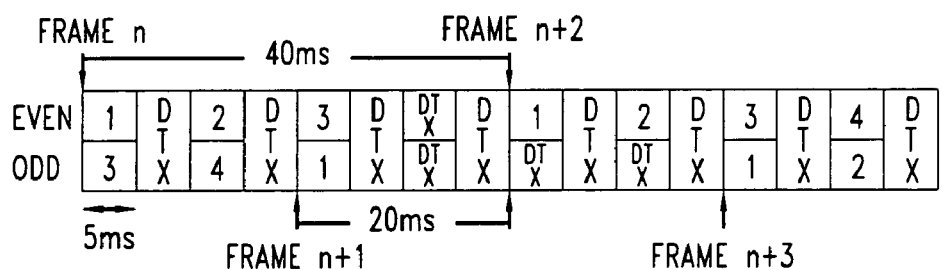

Referring to FIGS. 3, 4, 5 and 6, exemplary aspects of the present invention are depicted. More particularly, an example of an interlaced retransmission scheme is illustrated in FIG. 3. As shown, the scheme may transmit up to two (2) parallel frames over "even" and "odd" channels. These even and odd channels may employ different wireless resources, such as distinct channelization codes, for example, to keep the transmissions orthogonal. Each of the sub-frames may be separated by a do-not-transmit ("DTX") sub-frame or period in which no transmissions to the sane user are to take place. The transmitter, here, waits for an acknowledgment or non-acknowledgment message from the receiver during the DTX period. The transmission time in which each frame may start might be 20 ms, in one example. The frame transmission time, however, may be alternatively 40 ms long. In this illustrated example, a frame may be transmitted in support of a retransmission scheme using up to 4 sub-frames, labeled 1, 2, 3 and 4. Referring to FIG. 4, another exemplary aspect of the present invention is depicted. More particularly, an example of early-termination of a frame using a retransmission scheme is illustrated in FIG. 4. Here, the retransmission scheme causes an ACK associated with the frame n to be received after three (3) sub-frames are transmitted, while frame n+1 causes an ACK to be transmitted after the transmission of one sub-frame. In contrast, all four (4) sub-frames associated with frame n+2 are transmitted before an ACK is generated or for a time-out condition to occur.

Figure 5:
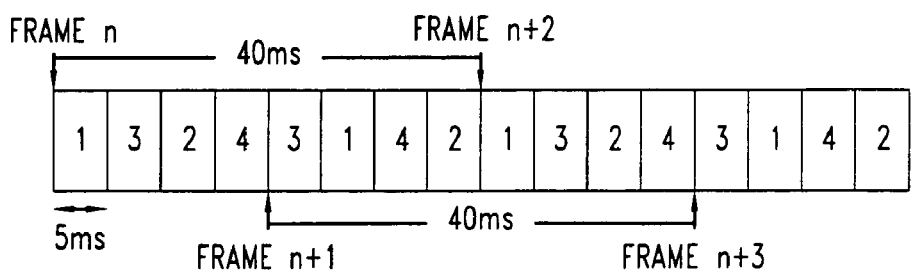

Referring to FIG. 3, yet another exemplary aspect of the present invention is shown. More particularly, an example of a time-interlaced retransmission scheme is illustrated in FIG. 5. The retransmission scheme here depicts a real-time wireless services frame, such as voice, is transmitted using up to four sub-frames. In this present example, each illustrated frame does not comprise any do-not-transmit ("DTX") sub-frames. Each of the sub-frames from even and odd frames is time-multiplexed. Consequently, the transmitter waits for an acknowledgment or a non-acknowledgment message from the receiver for the even frames during the odd frame transmission period, while during the even frame transmission period, the transmitter waits for an acknowledgment or non-acknowledgment message from the receiver for the odd frames. As shown, two (2) new frames transmission may be interlaced in such a manner to start within a 40 ms period, for example.

Figure 6:
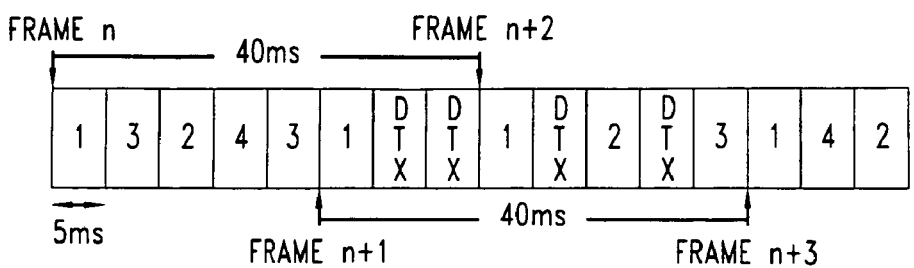

Referring to FIG. 6, still another exemplary aspect of the present invention is shown. More particularly, an example of an early-termination using a time-interlaced retransmission scheme is illustrated in FIG. 6. Here, the retransmission scheme causes an ACK to be transmitted after three subs frames associated with frame n are transmitted, while frame n+1, however, generates an ACK after one sub-frame is transmitted. In contrast, frame n+2 requires four sub-frames to be transmitted for an ACK to be generated or a time-out condition to occur.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center, and employed in conjunction with various multiple access schemes, such as CDMA and OFDMA, for example. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of wireless communication comprising:
   transmitting a first sub-frame associated with a first frame using a first wireless resource;
   receiving at least one an acknowledgment message and a non-acknowledgment message in response to transmitting the first sub-frame associated with the first frame;
   transmitting a first sub-frame associated with a second frame using the first wireless resource and a second wireless resource when an acknowledgement message is received in response to transmitting the first sub-frame associated with the first frame; and
   transmitting a second sub-frame associated with the first frame using the first wireless resource and transmitting the first sub-frame associated with the second frame using the second wireless resource when a non-acknowledgement message is received in response to transmitting the first sub-frame associated with the first frame.

2. The method of claim 1, wherein the first and second least wireless resources comprise at least one of a channelization code, a channelization tone and an allocate transmit power level.

3. The method of claim 1, wherein the second sub-frame of the first frame using the first wireless resource is transmitted concurrently with the transmitting of the first sub-frame from the second frame using the second wireless resource in response to receiving the non-acknowledgement message associated with the first sub-frame associated with the first frame.

4. The method of claim 3, wherein at least one of the first and second frames comprises a plurality of incrementally redundant sub-frames.

5. The method of claim 4, wherein at least one of the first and second frames comprises at least one do-not-transmit sub-frame.

6. The method of claim 5, wherein the first and second frames are assigned to a single user.

7. The method of claim 4, comprising:
   transmitting a subsequent sub-frame of the plurality of incrementally redundant sub-frames of the first frame in response to a non-acknowledgment message associated with a most recently transmitted sub-frame of the first frame.

8. The method of claim 7, comprising:
   terminating the transmitting of remaining sub-frames of the plurality of incrementally redundant sub-frames of the first frame in response to receiving an acknowledgement message associated with a most recently transmitted sub-frame of the first frame.

9. The method of claim 3, comprising:
   transmitting at least one sub-frame from a subsequent frame using at least the first wireless resource if a non-acknowledgement message associated with the second frame is received, and using at least the first and the second wireless resources if an acknowledgement message associated with the second frame is received.

10. The method of claim 9, wherein the acknowledgement message associated with the second frame is received in response to the receipt of one the incrementally redundant sub-frames of the second frame.

11. The method of claim 3, wherein at least one of the first and second frames comprises at least one of a voice sub-frame, a video sub-frame and a wireless gaming sub-frame.

12. A method of wireless communication comprising:
   transmitting at least one of an acknowledgement message and a non-acknowledgement message indicating whether a first sub-frame associated with a first frame was received using a first wireless resource;
   receiving a first sub-frame associated with a second frame using the first wireless resource and a second wireless resource when an acknowledgement message is transmitted; and
   receiving a second sub-frame associated with the first frame using the first wireless resource and receiving the first subframe associated with the second frame using the second wireless resource when a non-acknowledgement message is transmitted.

13. The method of claim 12, wherein the first and second least wireless resources comprise at least one of a channelization code, a channelization tone and an allocate transmit power level.

14. The method of claim 13, comprising at least one of:
   receiving the first sub-frame associated with the first frame using at least the first wireless resource; and
   failing to receive any sub-frames associated with the first frame before timing out.

15. The method of claim 14, comprising:
   awaiting reception of the second sub-frame of a plurality of sub-frames associated with the first frame using at least the first wireless resource in response to transmitting the non-acknowledgement message associated with the first frame.

16. The method of claim 15, wherein the second sub-frame of the first frame is received concurrently with the receiving of the first sub-frame from the second frame using the second wireless resource in response to transmitting the non-acknowledgement message associated with the first frame.

17. The method of claim 16, wherein at least one of plurality of sub-frames associated with the first and second frames comprises a plurality of incrementally redundant sub-frames.

18. The method of claim 17, wherein the first and second frames are assigned to a single user.

19. The method of claim 17, comprising:
   awaiting reception of a subsequent sub-frame of the plurality of incrementally redundant sub-frames of the first frame in response to a non-acknowledgment message associated with a most recently received sub-frame of the first frame.

20. The method of claim 15, comprising:
   receiving one sub-frame of a plurality of sub-frames associated with a subsequent frame using at least the first wireless resource if a non-acknowledgement message associated with the second frame is transmitted, and using at least the first and the second wireless resources if an acknowledgement message associated with the second frame is transmitted.

21. The method of claim 20, wherein the acknowledgement message associated with the second frame is transmitted in response to the receipt of one the incrementally redundant sub-frames of the second frame.

22. The method of claim 16, wherein at least one of the first and second frames comprises at least one of a voice sub-frame, a video sub-frame and a wireless gaming sub-frame.

* * * * *